(12) United States Patent
Fardanesh

(10) Patent No.: US 8,108,184 B2
(45) Date of Patent: Jan. 31, 2012

(54) METHODS AND SYSTEMS FOR POWER SYSTEMS ANALYSIS: A NON-ITERATIVE STATE SOLVER/ESTIMATOR FOR POWER SYSTEMS OPERATION AND CONTROL

(76) Inventor: Bruce Fardanesh, Upper Saddle River, NJ (US)

( * ) Notice: Subject to any disclaimer, the term of this patent is extended or adjusted under 35 U.S.C. 154(b) by 802 days.

(21) Appl. No.: 11/037,931

(22) Filed: Jan. 18, 2005

(65) Prior Publication Data

US 2005/0160128 A1    Jul. 21, 2005

Related U.S. Application Data

(60) Provisional application No. 60/536,660, filed on Jan. 15, 2004.

(51) Int. Cl.
*G06F 7/60* (2006.01)
*G06F 7/54* (2006.01)
*G06F 7/38* (2006.01)

(52) U.S. Cl. ............................... 703/2; 703/18; 708/446
(58) Field of Classification Search ................ 703/2, 18; 708/446

See application file for complete search history.

(56) References Cited

U.S. PATENT DOCUMENTS

| | | | | |
|---|---|---|---|---|
| 5,703,801 A | * | 12/1997 | Pan et al. | 708/517 |
| 6,810,370 B1 | * | 10/2004 | Watts, III | 703/10 |
| 6,993,548 B2 | * | 1/2006 | Walster et al. | 708/446 |

* cited by examiner

*Primary Examiner* — Paul Rodriguez
*Assistant Examiner* — Nithya Janakiraman

(57) ABSTRACT

Described are software tools and techniques for use in power system operations and control, enabling direct non-iterative solution and estimation of the state of a power system. Knowledge of the state of a power system is essential for secure, reliable and efficient operation of the system. Power system measurement data including the phasor data, as well as power system parameter and topology data are utilized. A set of redundant nonlinear equations, quadratic or third-order in form is formulated. The nonlinear equations are then solved directly for the state of the power grid. The methodology is non-iterative and offers a direct solution that does not depend on initial guess values or convergence of iterations, thus offering a more robust tool for energy management systems and power systems operation and control.

5 Claims, 4 Drawing Sheets

The Non-Iterative State Solver and State Estimator Process

FIG. 1 The Non-Iterative State Solver and State Estimator Process

METHODS AND SYSTEMS FOR POWER SYSTEMS ANALYSIS: A NON-ITERATIVE STATE SOLVER/ESTIMATOR FOR POWER SYSTEMS OPERATION AND CONTROL This non-provisional application claims priority to provisional application No. 60/536,660, filed on Jan. 15, 2004 and incorporated herein by reference.

BACKGROUND

Electric power systems (grids) are comprised of generating stations or power plants, transmission and distribution lines interconnected into networks, a variety of loads, and many other necessary pieces of equipment. Electrical power systems' operation and control functions rely on analytical software tools (computer programs) for setting safe and secure operating limits and maintaining reliable service. These software tools utilize mathematical models of the power system components and equipment in the form of differential and algebraic equations. The mathematical models, in conjunction with ohm's, Kirchhoff's, and other physical laws, are utilized to assemble sets of equations encoded into computer programs or software tools that represent the behavior of the power grid. The software tools provide the solutions to the above mentioned sets of equations and therefore are essential to the operation and control of power systems. The software tools can be coded or programmed in any and all programming languages and these programs can run on any and all computer hardware platforms with their associated operating systems. The power system operator at a typical energy control center utilizes these software tools or computer programs on a continuous basis for operating the power grid. These tools inform the power system operators of the state (voltage magnitude and phase-angle at all the buses) of the power grid so that they can take action to ensure that all system voltages and power flows are within specified limits and the system can survive potential disturbances. These software tools are heavily relied upon for monitoring and managing the performance of power systems. They are also essential to automating various facets of power systems' operations and control.

The continuously utilized or on-line software tools are deployed for real-time operation and control of power systems at utility or Independent System Operator (ISO) or Regional Transmission Operator (RTO) energy control centers. These software tools typically require telemetered data from voltage, current and power measurement devices throughout the power grid. The data is collected via "supervisory control and data acquisition" (SCADA) or similar systems. A SCADA system and the associated computational tools are collectively referred to as an Energy Management System (EMS). The collected asynchronous (scanned every 2 to 4 seconds) telemetry data from SCADA is fed into an existing software tool, here referred to as a traditional State Estimator (SE). Given these measurements, the SE estimates the state of the power system using typically a Least-Squares best-fit procedure. The SE output or the state of the power system is in turn used to determine the resulting power flow values as well as the system parameters that are not directly measured or measurable. Other advanced network analysis functions such as operator's power flow, contingency ranking and analysis, economic dispatch, etc., may also be implemented using the state of the system or the SE output.

The AC state estimation problem formulation in the SE software tool results in a set of nonlinear equations. In a traditional SE tool, Newton and Newton-Raphson methods or variations thereof are conventionally used to iteratively find solutions to the set of nonlinear equations. Newton-based iterative solution methods, for example, begin with an initial estimate (guess) of the solution where a matrix of gradients or partial derivatives, referred to as "the Jacobian," may be determined. This matrix is used to determine a correction to the initial estimate using a linear approximation of the nonlinear equations. The correction is then added to the initial estimate, which is then used as a new solution or starting point in the iterative process. Iterations are continued until the difference between two consecutive solutions is less than a specified tolerance, i.e., a convergence criterion is satisfied or convergence is achieved. Newton-based solution methods normally converge in a few iterations; however, these methods require that the initial estimate be close to the true or actual solution.

The prior art related to the traditional SE tool described above thus depends on iterative solution of a set of nonlinear equations and therefore on the quality of the initial estimate (guess). If the initial estimate is far away from the solution point of the problem, due to sudden changes or dynamic system fluctuations, non-convergence may result, leaving the power grid operator blind to the state of the system. Hence, this divergence can therefore limit the use of iterative solutions in the real-time and dynamic determination of the state of the power system, especially when severe disturbances occur in the system.

The new art presented via the disclosure herein provides a more robust software tool for operation and control of power grids by solving the sets of nonlinear equations non-iteratively and in one shot for determining the state of the power system. There is no initial estimate or guess required therefore eliminating this dependency. There are no iterations and therefore no divergence issues. Such software tools provide a superior, more robust, and more reliable performance in the operation and control of power grids. The new software tools disclosed herein are envisioned to be an integral part of a new generation of the SCADA/EMS to be developed and deployed.

SUMMARY

In particular, and by way of example only, according to an embodiment, provided are software tools for operating and control of a power system, comprising: formulating by way of writing equations and coding to produce a set of nonlinear equations representative of a power system and containing parameters and unknowns; transforming the set of nonlinear equations into a corresponding first set of linear equations via a change of variable; subsequently parametrically solving for a number of the unknowns in terms of the remaining; defining a set of quadratic equations; making a change of variable and transforming the set of quadratic equations into a second set of linear equations; and solving the second set of linear equations to define a complete solution set for the power system unknowns; and presenting the solution or the results on a one-line diagram on a computer screen or on a utility energy control center map-board to the power system operators.

In one embodiment, provided are software tools for analyzing and thus for operating and control of a power system comprising: an algorithm for transforming a set of $2^{nd}$ or $3^{rd}$ order nonlinear equations, representative of a power system and having parameters and unknowns, into a first set of linear equations having a coefficients matrix, a variables vector and a right hand side vector; an algorithm for solving for a first variable set in terms of a second variable set in the first set of linear equations; for formulating a set of quadratic equations, and for transforming the set of quadratic equations into a second set of linear equations wherein a third variable set is defined; an algorithm for calculating the third, second and first variable sets, and thus for determining a solution for the original set of nonlinear equations; and a processor for executing the transforming, the solving and the calculating of the programmed or coded equations, procedures, and algorithms; and for presenting the solution set to the power system operators.

In one embodiment, provided are software tools for analyzing and thus for operating and control of a power system, comprising: defining a set of nonlinear equations representative of a power system and containing power system parameters and unknowns; receiving, reading in, or inputting power system parameters and inputting or reading in power system measurements from various metering devices including Phasor Measurement Units (PMU) and/or phasor data concentrators; calculating the solution set for the set of nonlinear equations, and solving for the power system unknowns and unmeasured values. (Phasors are known in the electrical art as being vector or complex-number representations of sinusoidal waveforms.)

In one embodiment, software tools or products have instructions, stored on computer-readable media, wherein the instructions, when executed by a computer, perform steps for power systems analysis and thus for operating and control of a power grid, comprising: reading in the input values; instructions for formulating a set of nonlinear equations representative of a power system and containing parameters and unknowns; instructions for transforming the set of nonlinear equations into a corresponding first set of linear equations via a change of variable; instructions for parametrically solving for a number of the unknowns in terms of the rest, instructions for defining a second set of quadratic equations; instructions for making a change of variable and transforming the set of quadratic equations into a second set of linear equations; and solving the second set of linear equations to ultimately define a solution for the original set of nonlinear equations and thus the power system unknowns.

DETAILED DESCRIPTION

Following the northeast U.S. blackout of Aug. 14, 2003, and based on the recommendations of a joint US/Canadian investigation report, the U.S. Department of Energy initiated the Eastern Interconnection Phasor Project (EIPP) later referred to as the North American Synchro-Phasor Initiative (NASPI). The goal of the project or initiative is to instrument the entire eastern interconnection with GPS-synchronized measurement systems, also called Phasor Measurement Units (PMU). Working together, the North-American Electricity Reliability Corporation (NERC), ISOs and many utilities, are making real-time synchronously measured data available at central locations via various communication channels and networks. The software tools, systems and methods disclosed herein enable utilization of synchronously measured data for direct solution and estimation of the state of a power system.

The disclosure herein thus concerns operation, monitoring, management and control of a power system. The software tools and the associated procedures and algorithms disclosed herein make possible a synchronized-measurement-based (or phasor-measurement-based) one-shot, non-iterative solution and estimation of the state of a power system. It is anticipated that the combination of the one-shot, non-iterative solution techniques disclosed herein, and the use of computers with multiple processors, can significantly reduce computation time and improve performance of power system analysis tools. Reduced computation time will enable real-time analysis and more automated control and operation of power systems. See, B. Fardanesh, "Future Trends in Power Systems Control", IEEE Computer Applications in Power (CAP), Vol. 15, No. 3, July 2002, incorporated herein by reference.

Before proceeding with the detailed description, it is to be appreciated that the present teaching is by way of example, not by limitation. The concepts herein are not limited to use or application with one specific power system. Thus, although the instrumentalities described herein are for the convenience of explanation, shown and described with respect to exemplary embodiments; it will be appreciated that the principles herein may be equally applied in all power systems.

In accord with one embodiment, the software tools solve for or estimate the state of a power system. The software tools use a direct, non-iterative computational technique, as will be more fully explained below. In the direct, non-iterative solution of the set of nonlinear equations, synchronous measurement of a sufficient number of the system variables is available via one or more communication channels. The communication channels may include but not be limited to leased lines, fiber optics, modems, computer networks, LAN/WAN, wireless, etc.

The Non-Iterative State Solver

Figure 1:
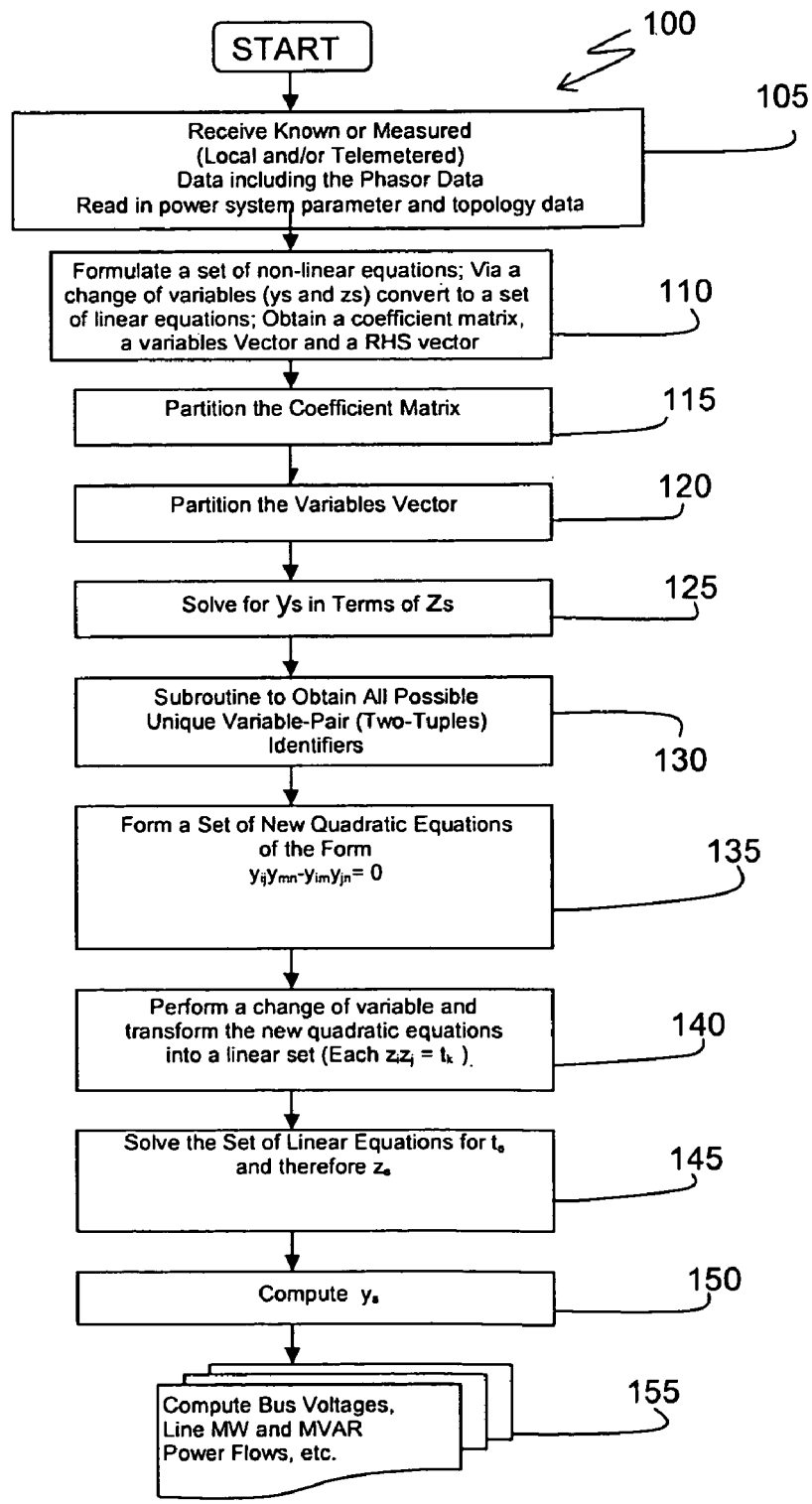
FIG. 1 is a flow chart illustrating one process embodiment for the non-iterative state solver and estimator software tools.

FIG. 1 illustrates a flow chart of an exemplary process 100 for solving for the state of a power system, in accordance with an embodiment. In this exemplary process 100, system measurements and parameters, which may include bus voltage magnitudes and/or phase angles (including phasors), real and reactive transmission line flows, system topology data, system transmission line data, generation and load values, are available and provided (block 105). Phasors are known in the electrical arts as being vector or complex-number representations of sinusoidal waveforms providing the magnitude and phase-angle information.

Once system parameters and measurements have been received, read-in and/or input, nonlinear power injection; power or current flow, voltage and other measurement equations are formed as a set of nonlinear equations, block 110. More specifically, using a first change of variables; e.g. $x_i x_j = y_{ij}$, the nonlinear equations are transformed into a set of linear equations consisting of a matrix A, a variables vector VAR, and a right hand side vector RHS, in the form of $$[A][VAR]=[RHS] \quad (1)$$

As shown in block 115, matrix A is parsed into a non-singular square matrix portion and the remaining square or rectangular matrix in the form of $$[MAT \mid ZMAT]\begin{bmatrix} Y \\ Z \end{bmatrix} = [RHS] \quad (2)$$

where: [MAT] is a non-singular square matrix;
[ZMAT] is the remaining square or rectangular part of matrix [A];

[Y] includes the $y_{ij}$ variables associated with matrix [MAT]; and

[Z] includes the $y_{ij}$ variables associated with the remaining square or rectangular matrix, renamed $z_1, z_2, \ldots z_k$ in the order they appear.

One skilled in the art has the necessary knowledge to reorder the columns and/or rows of the matrix to ensure the non-singularity of the square partition MAT and thus determine the first variable set to be solved in terms of the remaining set. The variables vector VAR is also partitioned into a set of "y" and "z" variables (block 120), i.e., those variables corresponding to the square portion and those corresponding to the remaining matrix, respectively. The RHS vector is also partitioned accordingly.

Further, the "y" variables may be parametrically determined in terms of the "z" variables in the form of:

$$Y = MAT^{-1}(RHS - ZMAT \cdot Z) \quad (3)$$

where each $y_{ij}$ is expressed as a linear combination of the "z" variables, block 125.

Subsequently, unique and valid variable pair combinations (two-tuple product pairs) are formed providing the basis of a set of quadratic equations, as shown in block 130. In one embodiment and by way of example only, the subroutine for generating all possible unique identifier pairs includes the following steps: (1) get an array Bin from the main program containing the identifiers for the y and z variables in the variables vectors, wherein the identifiers are integer numbers with p (an even number) of digits, formed such that Mod (identifier, $10^{p/2}$) will result in the index of the one of the original variables; the index for the second variable is found by subtracting $10^{p/2}$(Mod(identifier, $10^{p/2}$)) from the identifier; (2) for all possible pairs of identifiers, pars the two identifiers and obtain four indices; form new identifier pairs by switching the index values in the identifiers, thus resulting in y-variable product pairs in equal quantity; (3) ensure the new equivalent identifier pairs are different than the original pair they resulted from; (4) ensure the new identifiers are legitimate, i.e. contained in the Bin array; and (5) return a vector with all possible unique pairs of identifiers. The unique and valid variable pairs can be obtained in a number of ways and using many varieties of algorithms producing the same final result.

As shown in block 135, the product pairs are utilized to generate equations of the following form:

$$y_{ij}y_{mn} = y_{im}y_{jn} = \ldots = y_{in}y_{jm} \quad (4)$$

where:

i=0, ... i max;

j=0, ... j max;

m=0, ... m max;

n=0, ... n max: and i max, j max, m max, and n max depend on the total number of variables and the maximum number of unique two-tuple product pairs possible.

Still referring to FIG. 1, the set of quadratic equations is solved using a second change of variables, e.g. $z_i z_j = t_k$, and $z_o = 1$, thereby creating a new set of linear equations, block 140. In one embodiment and by way of example only, the steps of a subroutine used to convert $y_{ij}y_{mn} - y_{im}y_{jn} = 0$ quadratic equations in terms of z variables, into a set of linear equations in terms of t variables may include: (1) from the subroutine output get a set of identifiers forming equations of the type $y_{ij}y_{mn} - y_{im}y_{jn} = 0$, wherein each $y_{ij}$ can be given as a vector containing the coefficients of the z terms; (2) form interim matrices by taking the transpose of the coefficient vector corresponding to $y_{ij}$ and multiplying it by the coefficient vector corresponding to $y_{mn}$; (3) form a similar interim matrix for the next product, and subtract the two interim matrices; (4) add the resultant matrix to its transpose. The upper triangular portion of this matrix will contain the coefficients of the set of linear equations in terms of variables $t_k$ as well as the constants forming the right hand side vector for the set of equations. Each (i,j) pair from the matrix is uniquely mapped to a one-dimensional vector. The collection of all these one-dimensional vectors, form the coefficients matrix for the set of linear equations in terms of the variables $t_k$.

Subsequently, the above set of equations is solved for the $t_k$ variables, block 145. In an alternative embodiment, a psuedoinverse (or best-fit linear solution) can be used to solve for the $t_k$ variables. This alternative approach may include various rearrangement and/or elimination of rows and columns of the coefficient matrix for the $t_k$ variables, as well as various decomposition methods for this matrix. Knowing the $t_k$ variables, the z variables are subsequently known.

Referring now to block 150, knowing the z variables, the variables $y_{ij}$ are determined, and a solution set is defined to provide the power system unknowns, block 155. The dual transformation process disclosed and deployed here for the purpose of solving for and estimating the state of a power system is referred to as relinearization. See "Crytpanalyis of the HFE Public Key Cryptosystem," Kipnis and Shamir, published in the Proceedings of Crypto '99, Springer-Verlag, which presents a prior art example of $2^{nd}$-order relinearization.

We now consider an example of solving a series of quadratic nonlinear equations having $2^n$-order as well as linear terms, using the relinearization process. The equations to be solved are presented as:

$$x_1^2 - 2x_1x_2 + x_3^2 + x_2 = 8$$

$$2x_2x_3 - x_2^2 + 2x_1 = 10$$

$$5x_1x_3 - x_1x_2 + 3x_3 + x_2^2 = 26$$

$$7x_1^2 - 2x_2x_3 + x_3^2 - 5x_3 = -11$$

$$x_1^2 + x_2^2 - 5x_2x_3 + 12x_1 = -13 \quad (5)$$

Establishing a first change of variable $y_{ij} = x_i x_j$ and assuming $x_0 = 1$, equations (5) are written as follows:

$$\begin{bmatrix} 1 & -2 & 1 & 1 & 0 & 0 & 0 & 0 & 0 \\ 0 & 0 & 0 & 0 & 2 & -1 & 2 & 0 & 0 \\ 0 & -1 & 0 & 0 & 0 & 1 & 0 & 5 & 3 \\ 7 & 0 & 1 & 0 & -2 & 0 & 0 & 0 & -5 \\ 1 & 0 & 0 & 0 & -5 & 1 & 12 & 0 & 0 \end{bmatrix} \begin{bmatrix} y_{11} \\ y_{12} \\ y_{33} \\ y_{20} \\ y_{23} \\ y_{22} \\ y_{10} \\ y_{13} \\ y_{30} \end{bmatrix} = \begin{bmatrix} 8 \\ 10 \\ 26 \\ -11 \\ -13 \end{bmatrix} \quad (6)$$

Equation (6) is then partitioned to form a non-singular square (left partition) and remaining matrix (right partition), with the variables associated with the right partition changed to $z_1, z_2$, etc.:

$$\begin{bmatrix} 1 & -2 & 1 & 1 & 0 & 0 & 0 & 0 & 0 \\ 0 & 0 & 0 & 0 & 2 & -1 & 2 & 0 & 0 \\ 0 & -1 & 0 & 0 & 0 & 1 & 0 & 5 & 3 \\ 7 & 0 & 1 & 0 & -2 & 0 & 0 & 0 & -5 \\ 1 & 0 & 0 & 0 & -5 & 1 & 12 & 0 & 0 \end{bmatrix} \begin{bmatrix} y_{11} \\ y_{12} \\ y_{33} \\ y_{20} \\ y_{23} \\ z_1 \\ z_2 \\ z_3 \\ z_4 \end{bmatrix} = \begin{bmatrix} 8 \\ 10 \\ 26 \\ -11 \\ -13 \end{bmatrix} \quad (7)$$

Further, variables "y" in equation (7) are parametrically solved for in terms of the "z" variables. In large scale systems, various sparsity techniques and various matrix decomposition techniques may be used for computational efficiency.

In solving for $y_{ij}$, each $y_{ij}$ is now a linear function of the "z" variables. In the next step, all unique and valid combinations of two-tuple products (or pairs) of $y_{ij}$ are formed, and a new set of quadratic equations in terms of the "z" variables is defined. These product pairs may be expressed in equations of the following form for all possible values of i, j, m, ..., and n:

$$y_{ij}y_{mn} = y_{im}y_{jn} = \ldots = y_{in}y_{jm} \quad (8)$$

The new set of quadratic equations shown in equation (8) are solved through a second change of variable using, for example, $z_i z_j = t_k$.

Continuing with the present example, a new non-singular, 14×14 coefficient matrix is formed as:

$$\begin{bmatrix} -241.5 & 2849 & 0 & 60 & 337 & 0 & 7.5 & 0 & -85 & 0 & -14.25 & -1989 & -1 & 0 \\ 64 & 0 & 260 & 156 & -17 & -10 & -6 & 0 & 0 & -30 & 0.5 & 0 & -25 & -9 \\ -163.5 & 1667 & -120 & -12 & 321 & -15 & -1.5 & 175 & 20 & 0 & -15 & -1700 & 0 & 0 \\ -13.5 & 97 & -26 & 0 & 10 & 1 & 0 & 0 & 0 & 3 & -0.75 & -17 & 5 & 0 \\ -90 & 10 & 0 & 0 & 118 & 0 & 5 & 0 & 0 & 0 & -9.75 & -1 & 0 & 0 \\ 0 & -85 & 0 & 0 & -9.5 & 0 & 0 & 0 & 5 & -1 & 0 & 0 & 0 & 0 \\ 0 & 0 & 29 & 26 & 0 & 10 & -1 & -100 & 0 & -4 & 0 & 0 & 10 & 0 \\ 0 & 5 & 0 & 26 & 0.5 & 0 & -1 & 0 & 0 & -5 & 0 & -1 & 0 & -3 \\ -162 & 3042 & 430 & 385 & -117 & 48 & 23.5 & -586 & -351 & -25 & 9.5 & 0 & 0 & -15 \\ 1125.5 & -11893 & 850 & -55 & -2120 & 95 & -40 & -1170 & 382 & -50 & 95 & 11700 & 0 & -5 \\ 231 & -2600 & 115 & -61 & 101 & -60 & -31 & 500 & 300 & -35 & -10 & 0 & -50 & -3 \\ 8 & -26 & -25 & -15 & 1 & -1.5 & -1.5 & 5 & 3 & 0 & -0.5 & 0 & 0 & 0 \\ -64.5 & 529 & -50 & -5 & 60 & -5 & 0.5 & 10 & 1 & 0 & -5 & -100 & 0 & 0 \\ 0 & 0 & 0 & -12 & 0 & 0 & -1.5 & 1 & 17 & 0 & 0 & 0 & 0 & 0 \end{bmatrix} \begin{bmatrix} t_1 \\ t_2 \\ t_3 \\ t_4 \\ t_5 \\ t_6 \\ t_7 \\ t_8 \\ t_9 \\ t_{10} \\ t_{11} \\ t_{12} \\ t_{13} \\ t_{14} \end{bmatrix} = \begin{bmatrix} 1020 \\ 676 \\ 348 \\ 60 \\ 25 \\ 0 \\ 0 \\ 0 \\ 2210 \\ -2465 \\ -754 \\ -130 \\ 145 \\ 0 \end{bmatrix} \quad (9)$$

The $t_k$ variables in equation (9) are then solved for using known methods resulting in a "z" vector in the form of:

$$[z_1 \, z_2 \, z_3 \, z_4 \, z_1 z_2 \, z_1 z_3 \, z_1 z_4 \, z_2 z_3 \, z_2 z_4 \, z_3 z_4 \, z_1^2 \, z_2^2 \, z_3^2 \, z_4^2] = [4 \, 1 \, 3 \, 3 \, 4 \, 12 \, 12 \, 3 \, 3 \, 9 \, 16 \, 1 \, 9 \, 9] \quad (10)$$

The $y_{ij}$ values are then calculated using equation (3) as:

$$Y = [y_{11} \, y_{12} \, y_{33} \, y_{20} \, y_{23}] = [x_1^2 \, x_1 x_2 \, x_3^2 \, x_2 \, x_2 x_3] = [1 \, 2 \, 9 \, 2 \, 6] \quad (11)$$

Substituting the values for "y" and "z", and solving for "x", the solution to the set of equations shown in equation (1) of this example is found to be:

$$x_1 = 1, x_2 = 2, \text{ and } x_3 = 3 \quad (12)$$

Other varieties of this algorithm may be used by forming three-tuple (or even higher) product combinations such as:

$$y_{ij}y_{mn}y_{pq} = y_{pi}y_{qn}y_{jn} = y_{pn}y_{jm}y_{qi} = \ldots = y_{qn}y_{pm}y_i \quad (13)$$

which are not utilized in this disclosure.

Considering now yet another example of the non-iterative approach, the method described herein is extended to solve a set of third-order nonlinear equations. Consider the following set of equations:

$$x_1^3 + 3x_1^2 x_2 + x_2^2 = 11$$

$$5x_1 x_2^2 + x_2^3 - 3x_1 = 25$$

$$x_1 x_2 x_3 + x_2 x_3 + x_1 - x_3^3 = -14$$

$$5x_1^2 x_2 - x_2 x_3 - x_2^2 = 0$$

$$x_2^3 + x_1^2 x_2 + x_1 x_2 x_3 + 2x_1 = 18$$

$$x_1^3 + x_2^2 + x_2 x_3 + x_1 = 12$$

$$-2x_1^3 + 5x_2^3 + x_1 x_2^2 + x_1 x_2 x_3 - x_3^3 = 21 \quad (14)$$

Once again, establishing a first transformation variable $y_{ijk}$ as $y_{ijk} = x_i x_j x_k$ and assuming $x_0 = 1$, the above equations are written in a non-singular square (left partition) and remaining matrix (right partition) form as follows:

$$\begin{bmatrix} 1 & 0 & 0 & 3 & 1 & 0 & 0 & 0 & 0 \\ 0 & 1 & -3 & 0 & 0 & 5 & 0 & 0 & 0 \\ 0 & 0 & 1 & 0 & 0 & 0 & 1 & 1 & -1 \\ 0 & 0 & 0 & 5 & -1 & 0 & 0 & -1 & 0 \\ 0 & 1 & 2 & 1 & 0 & 0 & 1 & 0 & 0 \\ 1 & 0 & 1 & 0 & 1 & 0 & 0 & 1 & 0 \\ -2 & 5 & 0 & 0 & 0 & 1 & 1 & 0 & -1 \end{bmatrix} \begin{bmatrix} y_{111} \\ y_{222} \\ y_{100} \\ y_{112} \\ y_{220} \\ y_{122} \\ y_{123} \\ z_1 \\ z_2 \end{bmatrix} = \begin{bmatrix} 11 \\ 25 \\ -14 \\ 0 \\ 18 \\ 12 \\ 21 \end{bmatrix} \quad (15)$$

Variables "y" in equation (15) are determined in terms of the "z" variables, where each $y_{ijk}$ is now a linear function of the "z" variables. In a next step, unique and valid combinations of two-tuple products (or pairs) of $y_{ijk}$ are formed resulting in a set of quadratic equations in terms of the z variables.

These equations, resulting from the equal product pairs, may be expressed in the following form for all possible values of i, j, k, m, n, . . . , and l:

$$y_{ijk}y_{mnl} = y_{imk}y_{jni} = \ldots = y_{ini}y_{jmk} \quad (16)$$

The set of quadratic equations shown in equation (16) are solved through a second change of variable, using e.g. $z_i z_j = t_k$.

$$\begin{bmatrix} 1222.6 & -927.6 & -69.9 & 462 & 26.5 \\ 1245.9 & -972.8 & -61.8 & 39.3 & 24.2 \\ -539 & 432.7 & 26.6 & -16.8 & -10.6 \\ 874.2 & -719.8 & -43.3 & 26.2 & 17.9 \\ 71.5 & -4.3 & -3.3 & 3.8 & 0 \end{bmatrix} \begin{bmatrix} t_1 \\ t_2 \\ t_3 \\ t_4 \\ t_5 \end{bmatrix} = \begin{bmatrix} -8068.9 \\ -9739.0 \\ 4417.7 \\ -7253.3 \\ -80.7 \end{bmatrix} \quad (17)$$

The $t_k$ variables in equation (17) are then solved using known methods resulting in a "z" vector in the form of:

$$[z_1 \; z_2 \; z_1 z_2 \; z_1^2 \; z_2^2] = [6 \; 27 \; 162 \; 36 \; 729] \quad (18)$$

Of note, when a direct solution of the linear set of equations is not possible, a pseudo-inverse or best-fit linear solution may be used to solve for $t_k$. This may include various rearrangement and/or elimination of rows and columns of the coefficient matrix for the $t_k$ variables, as well as various decomposition methods for this matrix.

The $y_{ijk}$ values are then calculated using equation (3) and shown to be $$Y = [y_{111} \; y_{222} \; y_{100} \; y_{112} \; y_{220} \; y_{112} \; Y_{123}] \quad (19)$$
$$= [x_1^3 \; x_2^3 \; x_1 \; x_1^2 x_2 \; x_2^2 \; x_1 x_2^2 \; x_1 x_2 x_3]$$
$$= [1 \; 8 \; 1 \; 2 \; 4 \; 4 \; 6]$$

Hence, the solution to the set of equations shown in (19) is shown to be:

$$x_1 = 1, x_2 = 2, \text{ and } x_3 = 3 \quad (20)$$

Again, as in the quadratic example, other varieties of this algorithm may be used by forming three-tuple (or even higher) product combinations such as:

$$y_{ijk}y_{mnl}y_{pqr} = y_{pik}y_{qml}y_{jnr} = y_{pnk}y_{jml}y_{qir} = \ldots = y_{qnk}y_{pml}y_{ijr} \quad (21)$$

It should be noted that, without loss of generality, these examples have been constructed to have integer valued solutions. In general the solution can be any real value.

In an AC power system, represented by "E" nonlinear equations requiring the determination of "E" unknowns, a solution may be determined using a non-iterative process when a sufficient number of measurements or known quantities are available, i.e., when the number of measurements or known quantities, or the redundancy in the equations, is in the order of:

$$\frac{E}{2} \text{ when } E \text{ is even;} \quad (22)$$

$$\frac{E-1}{2} \text{ when } E \text{ is odd,}$$

depending on the topology or interconnectivity of the transmission network being analyzed.

To program and build the software tools, three different problem formulations may be utilized as described below, specifically: real-variable equations in polar form; real-variable equations in rectangular form; and complex-variable equations.

Formulation 1: Real-Variable Equations Using the Polar Form

Power injection equations for an N-bus power system for both real and reactive power are given as a set of 2(N−1) real equations:

$$\sum_{i=1}^{N} V_i V_j V_{ij} \cos(\delta_i - \delta_j + \theta_{ij}) = P_{G_j} - P_{D_j}; \text{ and} \quad (23)$$

$$-\sum_{i=1}^{N} V_i V_j V_{ij} \sin(\delta_i - \delta_j + \theta_{ij}) = Q_{G_j} - Q_{D_j}$$

$$j = 2, \ldots N$$

where:
$V_i$ represents the voltage magnitude at bus i.
$\delta_i$ represents the voltage phase-angle at bus i.
$Y_{ij}$ represents the magnitude of the complex bus admittance matrix elements
$\theta_{ij}$ represents the angle of the complex bus admittance matrix elements
$P_{Dj}, Q_{Dj}$ represent real and reactive demand at bus j
$P_{Gj}, Q_{Gj}$ represent real and reactive voltage generation at bus j.

The first bus, i.e., bus number one, is usually designated as the slack or swing bus, and voltage at this bus is assumed to be known. In one embodiment, the slack bus voltage may be represented as a normalized value of 1 per unit at an angle of zero degrees. Therefore, the equations are written for buses 2 to N. The slack bus provides the system losses, as well as any additional power required to maintain total system power balance.

In at least one embodiment, when direct synchronous measurements of all bus voltage phase-angles are available, the sine and cosine terms associated with the phase angles may be directly evaluated and replaced by numerical values. The equations are then expressed in terms of the products of bus voltage magnitudes. When some, but not all, of the bus voltage magnitudes are also known, some linear terms will also exist in the problem formulation. The equations therefore will be quadratic containing second order $V_i V_j$ and/or linear terms $V_i$, conforming to the form required to obtain a solution using the software tool and the method described herein.

Formulation 2: Real-Variable Equations Using the Rectangular Form

In this formulation, the bus voltage phasors are represented in rectangular form, i.e., $\nabla_i = a_i + jb_i$, and the power injection equations for an N-bus power system may be formulated as 2(N−1) equations as:

$$\sum_{i=1}^{N} \text{Re}(Y_{ij}) \cdot (a_j a_i + b_j b_i) + \text{Im}(Y_{ij}) \cdot (a_i a_j - a_j b_i) = P_{G_j} - P_{D_j}; \text{ and} \quad (24)$$

$$-\sum_{i=1}^{N} \text{Re}(Y_{ij}) \cdot (a_j a_i - a_i b_j) + \text{Im}(Y_{ij}) \cdot (a_i a_j = b_j b_i) = Q_{G_j} - Q_{D_j}$$

$$j = 2, \ldots N$$

Where, $\overline{Y}$ represents the complex bus admittance matrix elements;

Using this approach, the formulation produces product terms of the real and imaginary parts of bus voltage phasor variables. If a voltage phasor is known, then linear terms will also appear in the equations. This formulation is therefore inherently suitable and in the form required for application of the software tool and the methodology described herein. Additional measurement equations including bus voltage phasor, line current phasor, and line power flow measurements are added to the above set of equation to meet the equation redundancy levels required for the non-iterative solution.

Formulation 3: Complex-Variable Equations

In this formulation, a set of (N−1) equations in (N−1) voltage phasor variables is formed with all variables retained in the complex form. In this instance, again, the bus admittance matrix elements) $\overline{Y}_{ij}$ are known and the equations (25) are inherently in the desired form. However, the variables are complex quantities. The formulation is as follows:

$$\sum_{i=1}^{N} \overline{V}_i \overline{V}_j^* \overline{Y}_{ij} = S_{G_j} - S_{D_j} \quad (25)$$

$$j = 2, \ldots N$$

where:

$\overline{V}_i$ represents the voltage phasor value at bus i.

$\overline{Y}_{ij}$ represents the complex bus admittance matrix elements;

$S_D = P_D + jQ_D$ represents the complex power demand at a given bus;

$P_D$ and $Q_D$ represent the real and reactive demand at the bus, respectively;

$S_G = P_G + jQ_G$ represents the complex power generation at a given bus;

$P_G$ and $Q_G$ represent the real and reactive generation at the bus, respectively; and the superscript * indicates the conjugate of the complex value.

Example Utilizing the Rectangular Formulation

Figure 2:
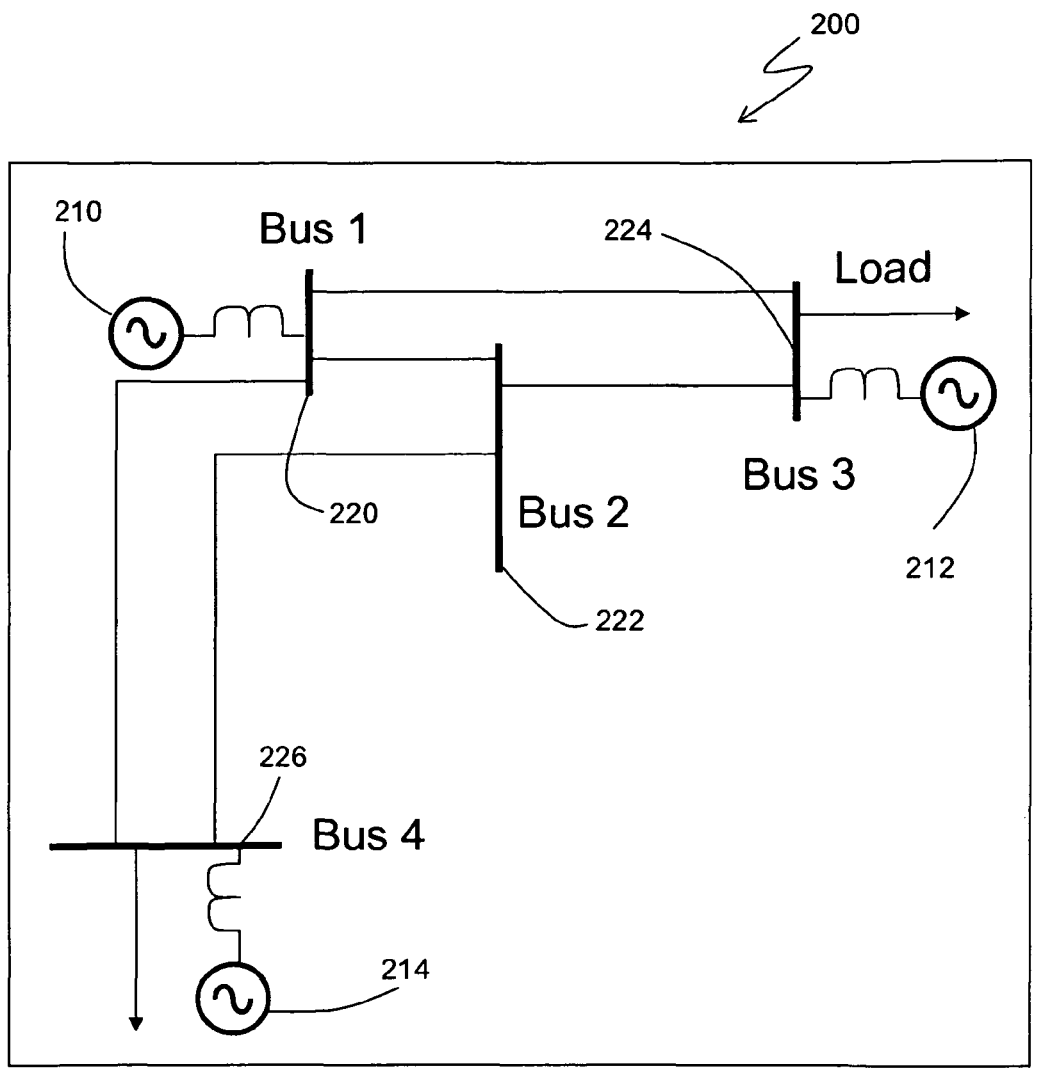
FIG. 2 is a schematic of one AC power system embodiment.

As an example of an operational application and utilization of the software tool and the methodology described herein for solving for the state of a power system, consider the 4-bus power system shown in FIG. 2. Illustratively, three generators or sources 210, 212, and 214, supply power through buses 220, 222, 224, and 226, respectively, in network 200. The source (generation) data and transmission line and bus load data for this system are shown in Tables 1 and 2, respectively.

TABLE 1

Bus Data

| Bus. No. | Bus Code | Bus Voltage | | Bus Load | | Bus Generation | |
|---|---|---|---|---|---|---|---|
| | | Magnitude Per Unit | Phase-angle Deg. | Mega watts | Megavars | Mega watts | Megavars |
| 1 | 1 | 1.0 | 0.0 | 0.0 | 0.0 | 0.0 | 0.0 |
| 2 | 0 | — | — | 0.0 | 0.0 | 0.0 | 0.0 |
| 3 | 0 | — | — | 2800 | 400 | 1000 | 200 |
| 4 | 0 | 0.927 | −18.038 | 2000 | 250 | 500 | 50 |

With regard to Table 1, column 1 represents a bus number and column 2 represents a bus code indicating the type of bus. In particular, as is known in the art, three types of buses and the associated codes can exist in power networks. In one embodiment a bus code equal to one (1) indicates a slack or swing bus. Further, a bus code equal to zero (0) indicates a load bus where injected MW(Megawatt) and MVAR(Mega Volt Ampere Reactive) values are known, and the voltage phasor values may be determined from the problem solution. A third kind of bus, which is not used in this example, represents a voltage-control bus, wherein the magnitude of the bus voltage is known and the MVAR injection at the bus is determined via the problem solution. In this case, the MVAR injection becomes an unknown creating a linear term in the set of equations, which can be solved for. Still referring to Table 1, columns 3 and 4 show an initial value for the magnitude and phase of the voltage at bus 1, i.e., the slack bus, and for any other bus for which the values may be known or directly measured. The voltages at busses 2-3 are unknown and are determined using the software tool and the methodology described herein. Columns 5 and 6 of Table 1 indicate the load and generation levels, respectively, at each bus on a per unit (p.u.) basis.

TABLE 2

Transmission Line Data

| Line No. | Sending End Bus No. | Receiving End Bus No. | R(p.u.) | X(p.u.) | ½ Shunt Susceptance (Bc) (p.u.) |
|---|---|---|---|---|---|
| 1 | 1 | 2 | 0.00100 | 0.00600 | 1.0 |
| 2 | 2 | 3 | 0.00200 | 0.02023 | 1.0 |
| 3 | 2 | 4 | 0.00300 | 0.02110 | 1.0 |
| 4 | 1 | 3 | 0.00500 | 0.04000 | 1.0 |
| 5 | 1 | 4 | 0.00500 | 0.04000 | 1.0 |

Table 2 provides the transmission line data for the simple power system presented in FIG. 2. In Table 2, column 1 represents the line number; columns 2 and 3 represent the bus numbers of the two ends of each line; columns 3 to 5 provide the "pi" model parameters of each transmission line. These parameters consist of the series resistance and reactance as well as the shunt susceptance values in per unit.

In particular, the AC power injection equations for the 4-Bus example system may be formulated in real-variable rectangular form as follows:

$$\sum_{i=1}^{4} \text{Re}(Y_{i2}) \cdot (a_2 a_i + b_2 b_i) + \text{Im}(Y_{i2}) \cdot (a_i b_2 - a_2 b_i) = 0 \quad (26)$$

$$-\sum_{i=1}^{4} \text{Re}(Y_{i2}) \cdot (a_2 b_i - a_i b_2) + \text{Im}(Y_{i2}) \cdot (a_i a_2 + b_2 b_i) = 0$$

-continued $$\sum_{i=l}^{4} \text{Re}(Y_{i3}) \cdot (a_3 a_i - b_3 b_i) + \text{Im}(Y_{i3}) \cdot (a_i b_3 + a_3 b_i) = 10 - 28 \quad (27)$$

$$-\sum_{i=l}^{4} \text{Re}(Y_{i3}) \cdot (a_3 b_i - a_i b_3) + \text{Im}(Y_{i3}) \cdot (a_i a_3 + b_3 b_i) = 2 - 4$$

$$\sum_{i=l}^{4} \text{Re}(Y_{i4}) \cdot (a_4 a_i + b_4 b_i) + \text{Im}(Y_{i4}) \cdot (a_i b_4 - a_4 b_i) = 5 - 20 \quad (28)$$

$$-\sum_{i=l}^{4} \text{Re}(Y_{i4}) \cdot (a_4 b_i - a_i b_4) + \text{Im}(Y_{i4}) \cdot (a_i a_4 + b_4 b_i) = 0.5 - 2.5$$

where:
$\overline{V}_i = a + jb_i$; and Re $(\overline{Y}_{ij})$ and Im $(\overline{Y}_{ij})$ are the real and imaginary parts, of the $Y_{bus}$ matrix elements for this system formed by utilizing the transmission line parameters given in Table 2; and the right hand side values are the net injection (generation minus load) real and reactive power values in per-unit, obtained by dividing the actual values in Table 1 by the base power value which is 100 MVA (mega-volt-amperes).

Furthermore, in this case, the voltage at bus 4 is treated as measured or known (as shown in Table 1). Therefore a sufficient number of measurements or known voltages (buses 1 and 4) are available, and the solution is determined using the non-iterative software tool.

Table 3 represents the results of the system state solution showing the determined voltage phasor values at busses 2 and 3 under the given loading condition, in accordance with the principles of the present disclosure and thus with no iterations. Even though a bus phasor was assumed to be known or measured, addition of other measurements such as power flows will enable the problem to be solved non-iteratively.

TABLE 3

| Bus. No. | Bus Code | Bus Voltage | | Bus Load | | Bus Generation | |
|---|---|---|---|---|---|---|---|
| | | Magnitude Per Unit | Phase-angle Deg. | Mega watts | Megavars | Mega watts | Megavars |
| 1 | 1 | 1.0 | 0.0 | 0.0 | 0.0 | 3448.904 | 445.52 |
| 2 | 0 | 0.968 | −6.602 | 0.0 | 0.0 | 0.0 | 0.0 |
| 3 | 0 | 0.924 | −19.464 | 2800 | 400 | 1000 | 200 |
| 4 | 0 | 0.927 | −18.038 | 2000 | 250 | 500 | 50 |

After the voltage phasor at each bus is determined, the power flow levels in all transmission lines as well as the system losses may be easily computed using techniques well known in the art. The disclosed software tool has also been applied to solve for the state of many test power systems such as the IEEE 30-bus benchmark power flow case and the correct solution is obtained with an assumed number of known or measured bus voltage and transmission line current phasors and/or other types of measurements.

The Non-Iterative State-Estimator

In one embodiment, the non-iterative state estimation tool in rectangular formulation is described herein. With a SE tool, generally, three types of SCADA measurements are used, and an appropriate set of equations are written for each type of measurement. Each measurement may have an error, and can be treated as an independent, zero-mean, Gaussian distributed random variable described with its probability density function. These measurement equations may include any or all of the following: 1) Bus power equations utilized when the (injected) bus power quantities are measured; 2) Bus voltage magnitude equations; and 3) Transmission line real and reactive flow equations when they are measured; and 4) Direct measurements of the bus voltage pharos and line current phasors when PMU data is available. An objective function in the least-squares sense is formed to determine the best set of system states that fit the measured data.

The SE problem, using rectangular variables $\overline{V}_i = a_i + jb_i$, is formulated as a maximum likelihood weighted Least Squares problem as follows:

$$\text{Min. } J(\underline{x}) = \sum_{i=1}^{M} \frac{[Z_i - f_i(\underline{x})]^2}{\sigma_i^2} \quad (29)$$

where:
M is the number of measurements;
J is the error function or the residual error at a given point;
$z_i$ is the $i^{th}$ measurement value;
x is the a vector containing all unknown $a_i$s and $b_i$s;
$\overline{f}_i$ is the function used to calculate the value being measured by the
$i^{th}$ measurement; and
$\sigma_i^2$ is a constant representing the variance for the $i^{th}$ measurement Each term in the summation above has a form depending on the quantity being measured. For example, for voltage magnitude, the corresponding term in equation (26) may be represented as:

$$\frac{\left[V_i^{meas^2} - (a_i^2 + b_i^2)\right]^2}{\sigma_{V_i}^2} \quad (30)$$

Real and reactive power flows on line g, connecting buses i and j, may be represented as:

$$\frac{[MW_{ij}^{meas} - (a_i^2 + b_i^2)\mathfrak{R}(y_{ij}) + (a_i a_j + b_i b_j)\mathfrak{R}(y_{ij}) - (a_i b_j - a_j b_i)\mathfrak{I}(y_{ij})]^2}{\sigma_{MW_{ij}^2}}; \text{ and} \quad (31)$$

$$\frac{[MVAR_{ij}^{meas} + (a_i^2 + b_i^2)\mathfrak{I}(y_{ij} + Bc) - (a_i a_j + b_i b_j)\mathfrak{I}(y_{ij}) + (a_i b_j - a_j b_i)\mathfrak{R}(y_{ij})]^2}{\sigma_{MVAR_{ij}^2}} \quad (32)$$

where:
$y_{ij}$ is the complex value of the series admittance of the transmission line connected between buses i and j; and
Bc is half of the shunt susceptance of that line; and
$\mathfrak{R}$ and $\mathfrak{I}$ signify the real and imaginary parts of a complex number, respectively.

For bus power injection measurements, the equations are identical to the power flow equations (24) above. Similar equations may be derived, written and formulated for line current measurements when line current measurements are available. For direct voltage and current phasor measurements, similar and even simpler equations can be written and included in J(x).

To minimize the above objective function J(x), its derivatives with respect to each variable are forced to zero. Each derivative equation in this case will be a polynomial of degree three or less. For example, the derivatives for typical voltage magnitude terms in J are in the form:

$$\frac{\partial J_v}{\partial a_i} = \frac{-4a_i\left[V_i^{meas^2} - (a_i^2 + b_i^2)\right]}{\sigma_{v_i}^2} = 0 \tag{33}$$

and the derivatives for typical real and reactive power flow terms in J are in the form:

$$\frac{\partial J_p}{\partial a_i} = \frac{2[MW_{ij}^{meas} - (a_i^2 + b_i^2)R(y_{ij}) + (a_i a_j + b_i b_j)R(y_{ij}) - (a_i b_j - a_j b_i)\Im(y_{ij})][(-2a_i + a_j)R(y_{ij}) - b_j\Im(y_{ij})]}{\sigma_{MW_{ij}^2}} = 0 \tag{34}$$

$$\frac{\partial J_q}{\partial a_i} =$$

$$\frac{2[MVAR_{ij}^{MEAS} - (a_i^2 + b_i^2)\Im(y_{ij} + Bc) - (a_i a_j + b_i b_j)\Im(y_{ij}) + (a_i b_j - a_j b_i)R(y_{ij})][2a_i\Im(y_{ij} + Bc) - a_j\Im(y_{ij}) + b_j R(y_{ij})]}{\sigma_{MWAR_{ij}^2}} = 0 \tag{35}$$

Derivatives with respect to the $b_i$ variables may be similarly formulated. These third-order equations are in a form suitable for solution using the third order extension of the solution method described herein.

Figure 3:
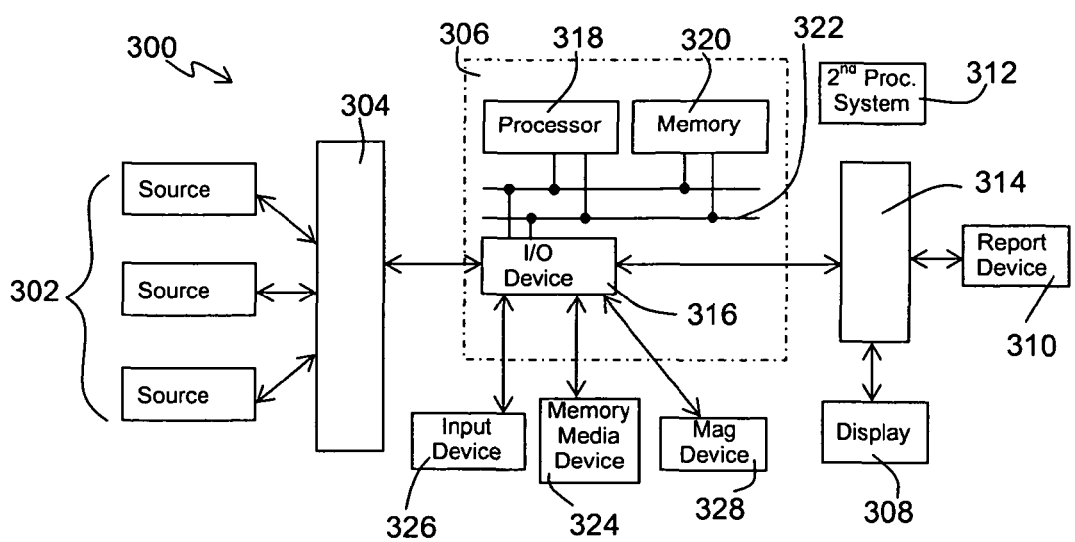
FIG. 3 is a schematic of one system for executing the processes of FIGS. 1 and 4, in accord with an embodiment.
Figure 4:
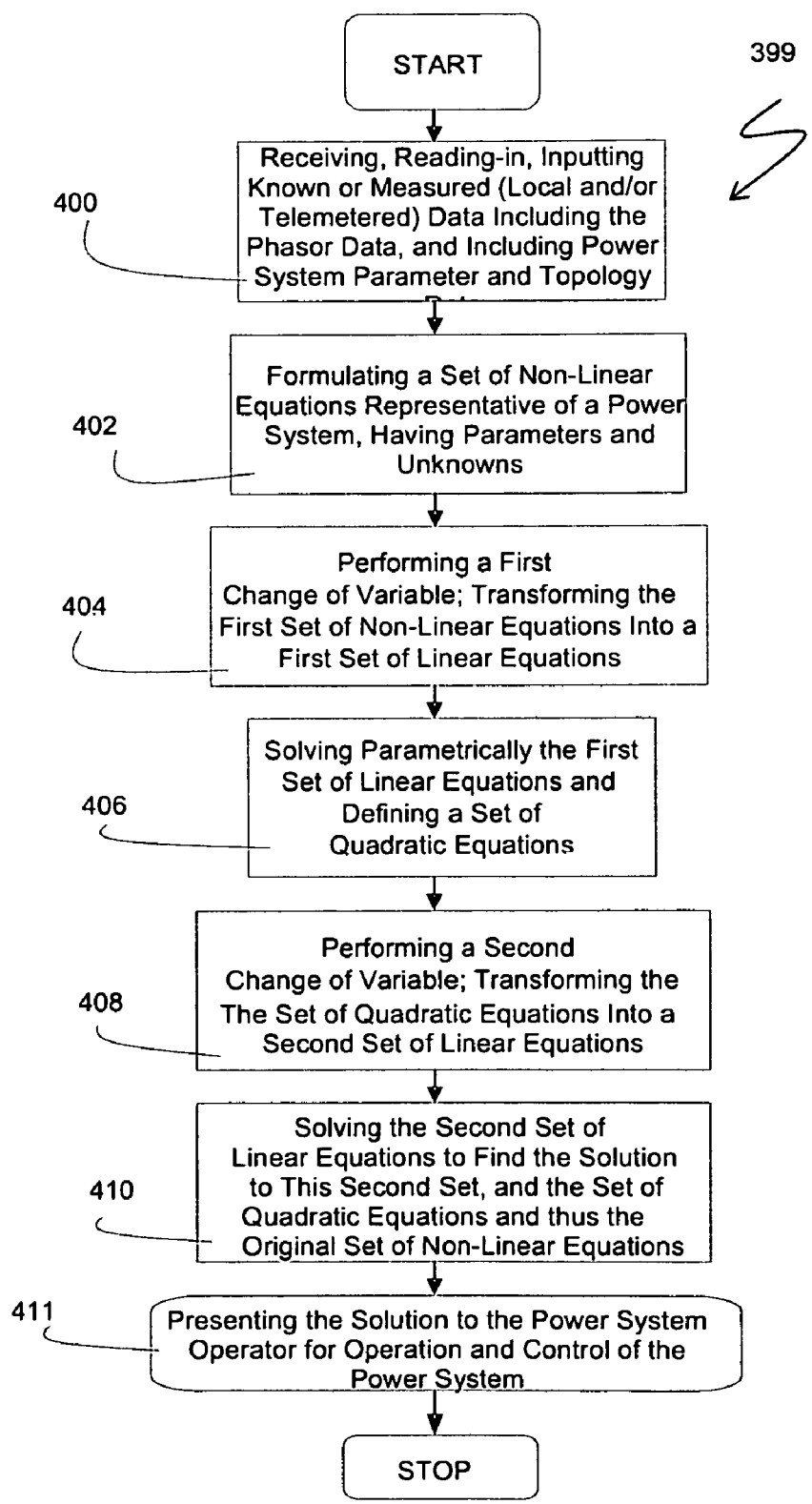
FIG. 4 shows a process for software tools for power system operation and control utilizing non-iterative power system analysis methods, in accord with one embodiment.

Considering now FIG. 3, a system 300 for implementing the principles disclosed herein—such as the processes of FIG. 1 or 4—is shown. In this exemplary system 300, input data is received from sources 302 over network 304, and is processed in accordance with one or more computer software programs executed by processing system 306. The results of processing system 306 may then be displayed on display 308, reported on reporting device 310, and/or processed by a second processing system 312. In system 300, the results of the processing system 306 are transmitted over network 314 to one or more of the display 308, the reporting system 310 or the processing system 312.

Specifically, processing system 306 includes one or more input/output devices 316 that receive data from the illustrated source devices 302 over network 304. The received data is then applied to processor 318, which is in communication with input/output device 316 and memory 320. Input/output device 316, processor 318 and memory 320 may communicate over a communication medium 322. Communication medium 322 may represent a communication network, e.g., ISA, PCI, PCMCIA bus, one or more internal connections of a circuit, a circuit card or other device, as well as portions and combinations of these and other communication media. Processing system 306 or processor 318 may be representative of a handheld calculator, special purpose or general purpose processing system, desktop computer, laptop computer, palm computer, or personal digital assistant (PDA) device, etc., as well as portions or combinations of these and other devices that can perform the operations illustrated in FIGS. 1 and 4.

In one embodiment, processor 318 includes software which, when executed, performs the operations illustrated herein. The software is contained in memory 320, is read or downloaded from a memory medium such as a flash memory, CD-ROM or floppy disk 324, is provided by manual input device 326, such as a keyboard or a keypad entry, or is read from a magnetic or optical medium 328 when needed. Information items provided by memory medium 324, or input device 326, or a magnetic medium 328 are accessible to processor 318 through input/output device 316. Further, the data received by input/output device 316 may be immediately accessible by processor 318, or may be stored in memory 320. Processor 318 may further provide the results of the processing shown herein to display 308, reporting device 310, or a second processing unit 312 through I/O device 316.

As one skilled in the art recognizes, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., ISA bus, micro channel bus, PCI bus, PCMCIA bus, etc. Alternatively, they may be connected via one or more internal connections of a circuit, circuit card or other device, as well as portions and combinations of these and other communication media, or an external network, e.g., the Internet and Intranet. In other embodiments, hardware circuitry (e.g., a VLSI integrated circuit) may be used in place of, or in combination with, software instructions to implement the embodiments disclosed herein. For example, the elements illustrated herein may also be implemented as discrete hardware elements or may be integrated into a single unit.

FIG. 4 shows a process 399 for non-iterative power system state solution and estimation, in accord with one embodiment. Process 399 may be used to analyze (solve for the state) and thus operate and control a power system and may be implemented by a computer system or processor, such as processor 318 in FIG. 3. As shown in FIG. 4, a set of nonlinear equations representative of power system unknowns is formulated, block 400. The set of nonlinear equations are transformed into a corresponding first set of quadratic equations, block 402. In block 404, a first change of variable operation is performed, and the first set of quadratic equations is transformed into a first set of linear equations. The first set of linear equations is solved, parametrically, (block 406), thereby defining a set of quadratic equations. Performing a second variable change, the set of quadratic equations is transformed into a second set of linear equations, block 408. Once defined, the second set of linear equations is solved to find the solution to both the set of quadratic equations, and thus the original set of nonlinear equations, block 410. The solution or the results are presented on a one-line diagram, on a computer screen, or on a utility control center map-board to the power system operators for operation and control of the power system, block 411.

As appreciated by those skilled in the art, the operations, processes, and methodologies illustrated in FIGS. 1 thru 4 may be performed sequentially, or in parallel, using one or more processors to determine specific values.

As can be appreciated by referring once again to FIG. 3, processing system 306 may be in two-way communication with each of sources 302 to provide results of the processing to sources 302. Processor system 306 may further receive or transmit data over one or more network connections from a server or servers, over one or more global computer communications networks such as: the Internet, an Intranet, a wide area network (WAN), a local area network (LAN), a terrestrial broadcast system, a cable network, a satellite network, direct utility owned or third party fiber optics, a wireless network, or a telephone network (POTS), as well as portions or combinations of these and other types of networks. As will be appreciated, networks 304 and 314 may also be internal networks, e.g., ISA bus, micro channel bus, PCI bus, PCMCIA bus, etc. Alternatively, the networks 304, 314 may also be one or more internal connections of a circuit, a circuit card or other device, as well as portions and combinations of these and other communication media or an external network, e.g., the Internet and Intranet.

Changes may be made in the above software tools, algorithms, methods, procedures, devices, and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present software tools or computer programs, methods, algorithms, devices and structures, which, as a matter of language, might be said to fall therebetween.

What is claimed is:

1. A non-transitory computer readable storage medium, storing computer executable instructions that when executed by at least one processor performs a method for analyzing a power system for the operation and control of said power system, the method comprising:
   receiving at said at least one processor, power system parameters and local and/or remote measurements including power system voltage and current phasor measurements, representative of said power system;
   formulating a set of non-linear equations, using said power system parameters and local and remote power system measurement values, and having said power system parameters and unknown variables;
   transforming the set of non-linear equations into a corresponding first set of linear equations;
   parametrically solving for a determined number of said unknown variables in terms of a remaining set of said unknown variables;
   defining a second set of non-linear equations in terms of the remaining set of unknown variables;
   changing variables of said second set of non-linear equations to define a second set of linear equations;
   solving said second set of linear equations to define a solution set used to determine said remaining set of unknown variables; and
   utilizing said determined unknown variables to determine all unknowns to analyze, operate and control said power system.

2. A non-transitory computer readable storage medium, storing computer executable instructions that when executed by at least one processor performs a method for non-iteratively determining or estimating the state of a power system, the method comprising:
   receiving, at said at least one processor, power system parameters and local and remote measurements including power system voltage and current phasor measurements, representative of said power system;
       formulating a first set of first and/or second order quadratic equations having said power system parameters and unknown variables;
   transforming the first set of first and/or second order quadratic equations into a corresponding first set of linear equations;
   parametrically solving a determined number of unknown variables in terms of a remaining set of said unknown variables;
   defining a second set of first and/or second order quadratic equations in terms of the remaining set of unknown variables;
   changing variables of said second set of first and/or second order quadratic equations to define a second set of linear equations;
   solving the second set of linear equations to define a solution set for said second set of first and/or second order quadratic equations; and
   utilizing said solution set to determine or estimate the state of said power system.

3. A non-transitory computer readable storage medium, storing computer executable instructions that when executed by at least one processor performs a method for non-iteratively determining or estimating the state of a power system, the method comprising:
   receiving, at said at least one processor, power system parameter values and local and remote measurements including power system voltage and current phasor measurements, representative of said power system;
       formulating a set of third order equations having said power system parameters and unknown variables;
   transforming said set of third order equations into a corresponding first set of linear equations;
   parametrically solving for a determined number of unknown variables in terms of a remaining set of said unknown variables;
   defining a set of quadratic equations in terms of the remaining set of unknown variables;
   changing variables of said set of quadratic equations to define a second set of linear equations;
   solving said second set of linear equations to define a solution set for said set of quadratic equations and said set of third order equations, to determine said power system unknown variables; and
   utilizing said solution set to determine or estimate the state of said power system.

4. A system for analysis, operation and control of a power system comprising:
   at least one processor;
   a display device, in communication with said at least one processor;
   a plurality of input sources, in communication with said at least one processor via a network connection;
   a memory in communication with said at least one processor, storing computer executable instructions and algorithms;
   wherein said processor, using said instructions and algorithms, performs the steps of:
   formulating a set of nonlinear equations, representative of said power system;
   transforming said set of nonlinear equations having said powei system parameters and unknown variables, into a first set of linear equations having a coefficients matrix, a variables vector and a right hand side vector;
   parametrically solving for a determined first variable set in terms of a remaining variable set in said first set of linear equations;
   formulating a set of quadratic equations using pair-products of expressions of said first variable set solution solved in terms of the remaining variable set, and transforming the set of quadratic equations into a second set of linear equations wherein a third variable set is defined;

calculating said third, and first variable sets; and calculating a solution set for the set of nonlinear equations and the set of quadratic equations;

wherein said at least one processor executes the transforming, solving and the calculating for display of said solution set to power system operators on said display device at an energy control center.

5. A non-transitory computer readable storage medium, storing computer executable instructions that when executed by at least one processor performs power system analysis for operation and control of said power system by power system operators comprising:

instructions for receiving, by at least one processor, power system parameter values and local and remote measurements including power system voltage and current phasor measurements, representative of said power system;

instructions for formulating a set of non-linear equations having said power system parameters and unknown variables;

instructions for parametrically solving a determined number of unknown variables in terms of remaining unknown variables;

instructions for defining a set of quadratic equations in terms of said remaining unknown variables;

instructions for changing variables of said set of quadratic equations to define a second set of linear equations;

instructions for solving said second set of linear equations to determine said remaining unknown variables and to define a solution set for said power system; and instructions for presenting said solution set to said power system operators via at least one display device at an energy control center, to operate and control said power system.

* * * * *